Figure 1:
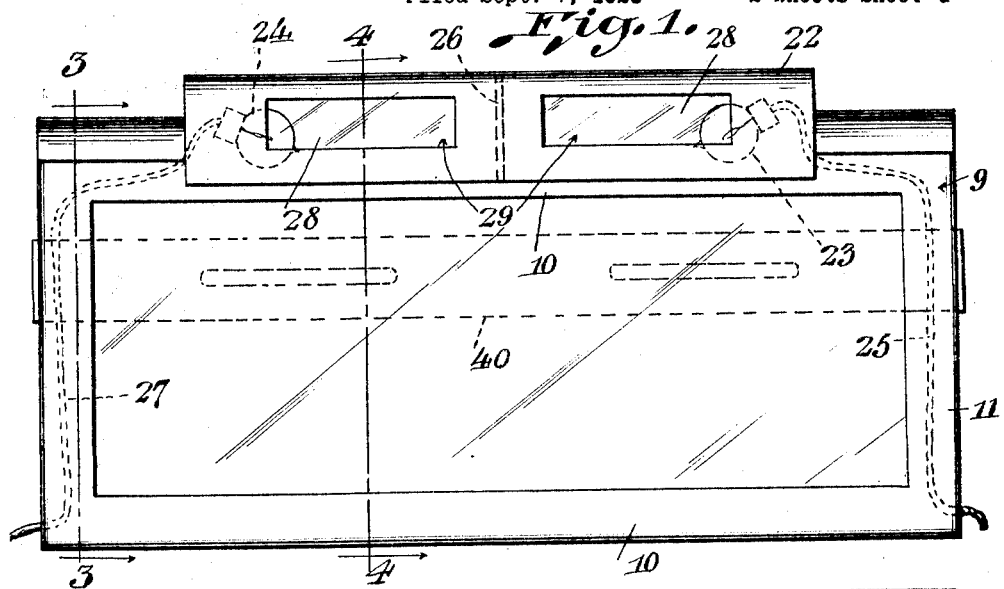

Jan. 10, 1928.

M. E. FRASIER

LICENSE PLATE HOLDER

Filed Sept. 7, 1926  2 Sheets-Sheet 1

1,655,993

Inventor:
Marin E. Frasier
by Quigg & Shaw
atty.

Jan. 10, 1928. 1,655,993
M. E. FRASIER
LICENSE PLATE HOLDER
Filed Sept. 7, 1926 2 Sheets-Sheet 2
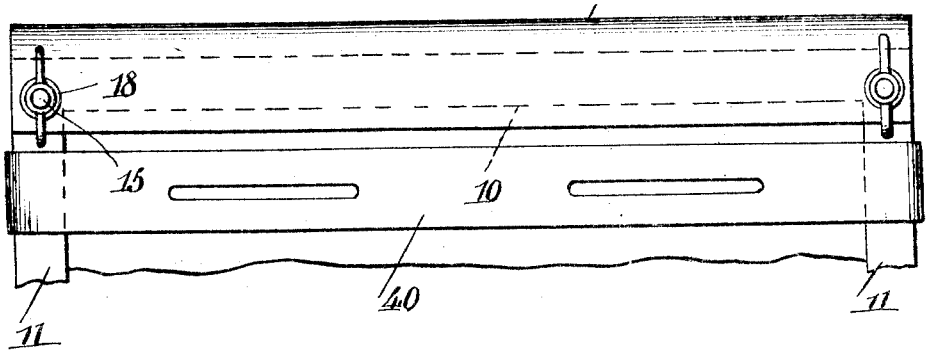
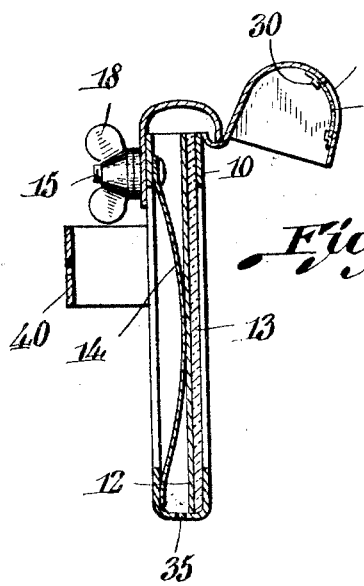
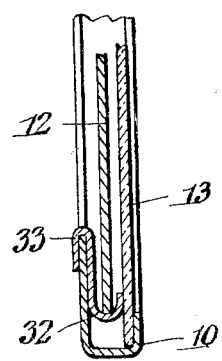
Inventor:
Marion E. Frasier Patented Jan. 10, 1928.

1,655,993

UNITED STATES PATENT OFFICE.

MARION E. FRASIER, OF CORINTH, NEW YORK, ASSIGNOR OF ONE-HALF TO JOHN H. PITKIN, OF CORINTH, NEW YORK.

LICENSE-PLATE HOLDER.

Application filed September 7, 1926. Serial No. 133,988.

This invention relates to license plate holders, and particularly to license plate holders of that character wherein there is combined means for display or illumination of the license plate and also a stop light associated with the control of the vehicle with which the device is used.

The primary object of the invention is to provide a license plate holder of such character that the various elements forming the combination set forth are so constructed, assembled and operated as to provide a device highly satisfactory for the various purposes, and which is of such construction as to minimize the opportunity for breakage or derangement.

A further object is to provide a license plate holder of such character that the plate itself is at all times maintained free from dirt or traffic dust or dampness, whereby the same is at all times clearly visible and readable.

A still further object is to provide illumination means in connection with a license plate of such character that the plate itself contributes to the signaling means usually employed in indicating that the vehicle will either stop or change its course.

A still further object is to provide a license plate holder of extremely simple construction, which is composed of but few simple and readily assembled parts, which has its parts so constructed and arranged as to protect the same against the arrangement or injury from the elements, which is readily applicable to all types of motor vehicles, which is capable of accommodating license plates varying in size, which requires no attention after once being properly applied and adjusted, and which may be produced and marketed at small cost.

With these objects in view, together with others which will appear as the description proceeds, the invention consists in the novel construction, combination and arrangement of parts, all as will be described more fully hereinafter, illustrated in the drawings and particularly pointed out in the claims.

Figure 2:
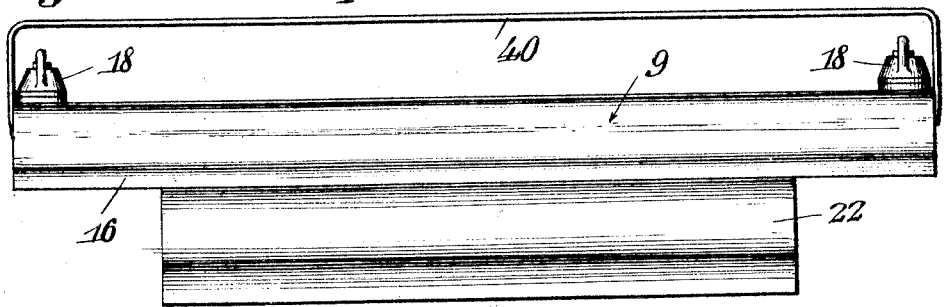
Figure 3:
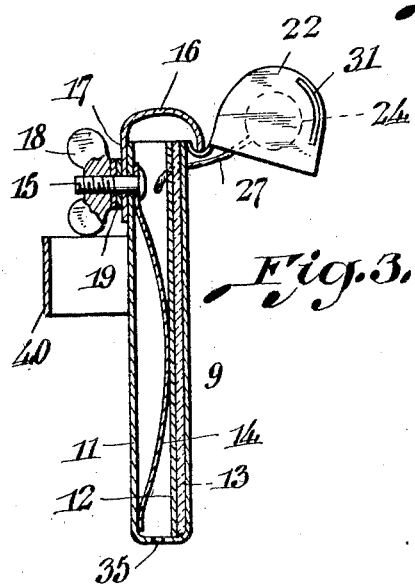
Figure 8:
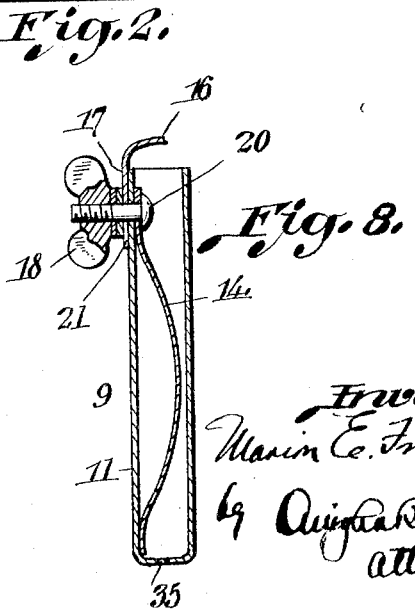

In the drawings:

Fig. 1 is a front elevation of a license plate holder constructed in accordance with the invention, Fig. 2 is a top plan view of the improved holder, Fig. 3 is a transverse sectional view taken substantially upon line 3—3 of Fig. 1, Fig. 4 is a similar view taken upon line 4—4 of Fig. 1, Fig. 5 is a rear elevation of the upper part of the license plate holder, Fig. 6 is a detail perspective view of a modified form of cover plate for the license plate holder, Fig. 7 is a fragmentary transverse sectional view showing means for the accommodation of license plates smaller than standard size, and Fig. 8 is a view similar to Fig. 3 and showing a further modification.

Referring now more particularly to the drawing, 9 represents generally the frame for the accommodation of license plates and this frame is, as usual, of rectangular form, and of a size slightly larger than license plates of standard dimension. This frame comprises longitudinal or horizontal bars 10 and end posts 11, permanently connected to each other in any approved manner so as to provide a rigid structure. The end post 11 and the bottom bar 10 of the frame are of channel formation, as shown particularly in Figs. 3 and 4, while the upper part of the upper horizontal bar 10 is cut away throughout its length to provide an opening through which the license plate may be introduced to the frame.

The license plate is represented generally at 12, and is arranged within the frame behind a glass or other transparent sheet or panel 13 of a size substantially similar to the license plate. Means are provided within the frame for firmly forcing the glass and license plate outwardly toward the forward portion of the frame, and firmly holding these elements against vibration or rattling, and to preclude the entrance of water or dust to the interior of the frame. This means, in the present instance, comprises springs 14 arranged within the end posts 11 so as to engage against the rear face of the license plate 12. These springs are secured to the frame preferably at their upper ends by a stud 15 which is rigidly affixed to the end of the spring and also to the adjacent part of the frame. The rear end of each stud protrudes beyond the frame and is threaded as shown. The leaf springs 14 thus assembled engage the end portions of the license plate and yieldably force the same toward the front of the holder, thus maintaining the same at all times rigid and forcing the glass 13 against the channel portions of the frame so as to make a dust and moisture-tight fitting. However, when it is desired to remove the plate or glass, it is but necessary to force the same rearwardly against compression of the spring and to lift the same out of the frame through the opening at the top thereof.

The top portion of the frame is provided with a closure member or cap 16. This cap conforms in general outline to the horizontal bar and end posts of the frame, being channeled as shown to engage over the upper end of the frame. The rear portion of this cap is provided with an apron 17, having openings near the ends thereof to receive the studs 15 protruding rearwardly from the frame. In assembling the cap, after the studs have been engaged in the openings, a wing nut 18 and suitable washers 19 applied to the stud and tightened will maintain the cap rigidly secured over the top of the frame.

In Fig. 8 there is shown a slight modification of this construction, wherein instead of a rigid stud, a bolt 20 is employed in securing the parts properly together. This bolt passes through an opening in the upper end of spring 14, through the frame as well as through an opening or slot in the apron 17 of the cap. Application of a wing nut to the threaded rear end of the bolt will tightly hold the several parts together.

In Fig. 6 there is illustrated a slight modification of the cap, wherein the apron 17 near its ends is provided with slots 21 open at their lower ends for more ready engagement with the studs or bolts carried by the frame.

Overlying the frame, and disposed slightly forward thereof, is an illuminating device including a casing or housing 22. This housing is elongated as shown but terminates at its ends inwardly from the extremities of the frame. This housing is rounded at its upper part so as to shed water and dirt, but is open throughout its lower portion as shown. Arranged within this housing, and preferably near the outer ends thereof, are incandescent lamps 23 and 24. The lamp 23, serving as a tail light, is ignited by a wire or other conductor 25 passing down through an end post 11 and out near the lower portion thereof to be connected with a suitable source of electrical energy. The housing or casing is provided centrally thereof with a partition 26 which divides the said housing into separate light compartments. The lamp 24 in the opposite end of the housing serves as a stop light, and its wire or conductor 27 passes from the lower portion of the adjacent end post 11 to be connected with the brake apparatus of the vehicle. It will be noted, particularly with reference to Fig. 1, that the lamps 23 and 24 are inclined downwardly, so that the rays of light project therefrom and fall directly upon the underlying license plate. Each of the compartments in the lamp housing is provided with an aperture 28 covered by a transparency of suitable color represented at 29. These transparencies are held within the housing by the clips or guide members 30 and are introduced thereto through openings 31 in the ends of the housing.

In instances where it is required to accommodate a license plate of a size substantially smaller than the frame, hook members 32 are employed. These members are channeled at their lower portions as shown, and at their upper ends have hooks 33 to engage over the rear channel portion of the frame. The license plate of smaller size rests its lower edges in the lower hook portion 32 of these members, and the plate is thus held in proper display position.

The frame thus constructed may be secured either to the front or rear of a motor vehicle, by means of a supporting bar 40 passing across the rear of the frame as shown. In instances where the frame is employed in the front of a vehicle, the transparent panes 29 in the lamp casing may be replaced by opaque panes, and, if desired, both lamps in the housing may be associated with the tail light illuminating means.

From the foregoing it is apparent that I have combined in a unitary structure means for display of a license plate, a rear or running light, and a stop or signal light. Under ordinary conditions, the lamp 23 will properly illuminate the license plate, and this lamp is so disposed that its rays fall upon the plate throughout the entire display surface thereof. The other lamp 24 is so located and arranged that when ignited, its rays illuminate the plate and also project through the stop light aperture. A double illuminating and warning effect is thus produced, as the sudden brightening of the license plate and illumination of the stop light, due to ignition of the lamp 24, will thus attract attention.

The spring elements 14 in the frame posts will be of sufficient strength to firmly force the overlying pane 13 into tight engagement with the channel members of the frame, whereby a dust and water-tight connection is made. It is preferred, however, that openings 35 be provided in the lower portion of the channel frame to permit of the escape of grit and moisture should any collect within the frame.

By thus keeping the plate itself free of moisture and dirt, proper display of the same is at all times assured, and should the glass become coated with moisture or traffic dust, it may be easily removed therefrom by the usual well-known methods.

While the foregoing is a description of the invention in its preferred form, it is apparent that variations in the details of construction and assemblage of parts may be liberally resorted to without departing from the invention as defined in the claims.

Having thus described my invention, I claim:

1. In a holder for license plates, a frame comprising hollow posts, a frame spring in each post, a stud securing each spring at one end to said frame and protruding beyond the latter, a closure for said frame, said closure having openings to receive said studs, and nuts for engagement with said studs.

2. In a holder for license plates, a rectangular frame adapted to receive a plate, studs projecting from one side of said frame, flat springs secured within said frame and at one end to said studs, a cap member for said frame, engageable with said studs and nuts for engagement with said studs.

3. In a holder for license plates, a hollow frame open at one side and adapted to receive a plate, studs projecting from one side of said frame, a cap member to close the open side of said frame, an apron formed on said cap member and said apron having openings to receive said studs.

4. In a holder for license plates, a frame open at its upper end, a lamp casing carried by said frame and projecting forwardly from the latter, studs projecting from the rear of said frame, a cap member to close the open end of said frame, a portion on said member to engage with said casing, an apron on said member to engage with said studs, and nuts for said studs.

In testimony whereof I affix my signature.

MARION E. FRASIER.